Figure 4:
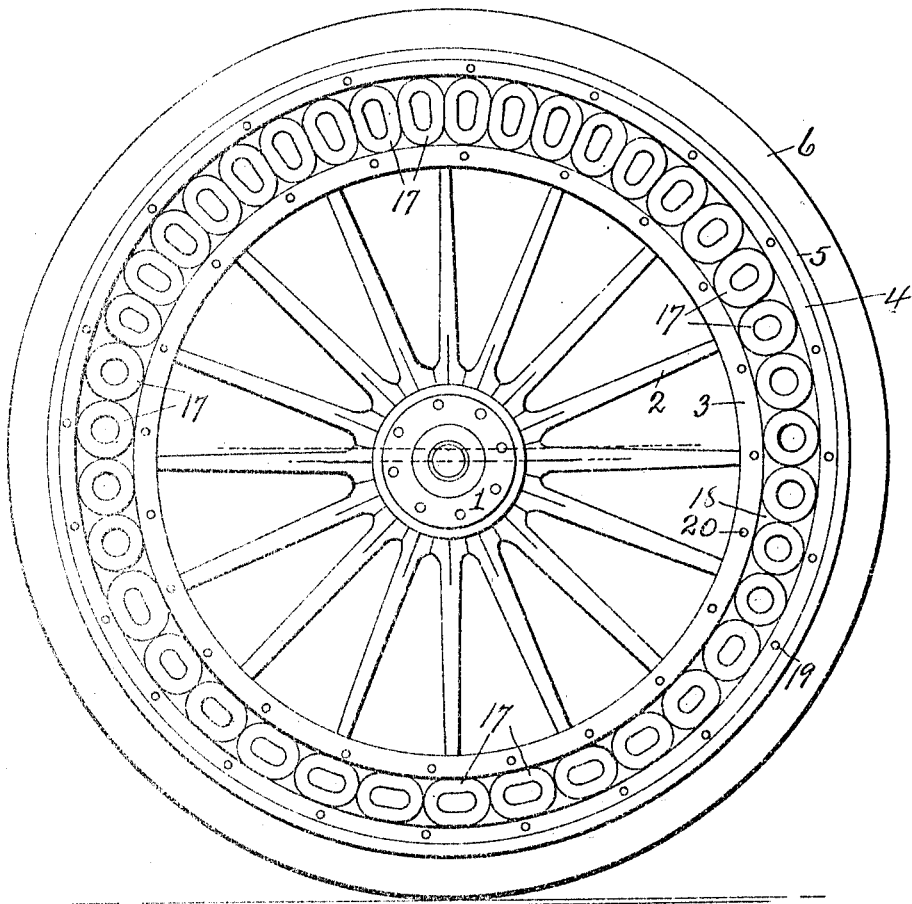

H. J. SEWELL.
VEHICLE WHEEL.
APPLICATION FILED MAY 4, 1911.
1,026,370.
Patented May 14, 1912.
2 SHEETS—SHEET 1.
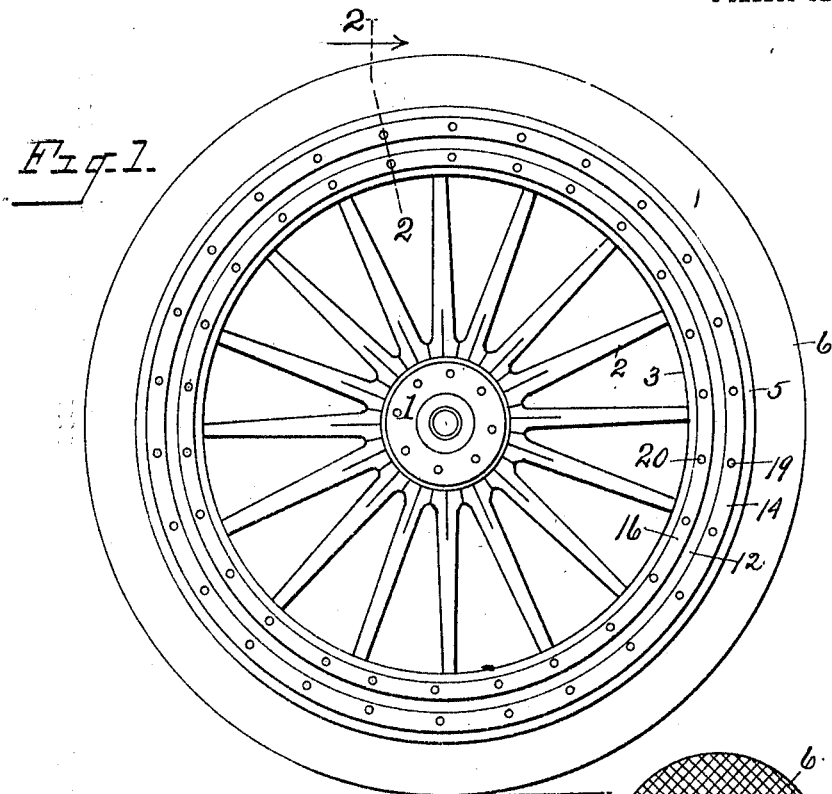
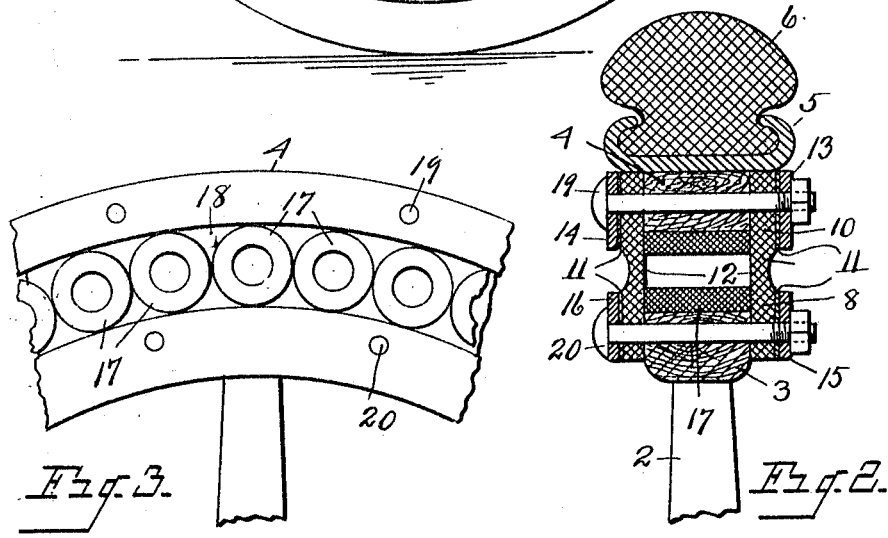
Witnesses
O. B. Baenziger.
V. C. Spratt
Inventor
Herbert J. Sewell
By Parker V. Burton
Attorneys

H. J. SEWELL.
VEHICLE WHEEL.
APPLICATION FILED MAY 4, 1911.

1,026,870.

Patented May 14, 1912.
2 SHEETS—SHEET 2.

UNITED STATES PATENT OFFICE.

HERBERT J. SEWELL, OF DETROIT, MICHIGAN.

VEHICLE-WHEEL.

1,026,370.　　　　Specification of Letters Patent.　　Patented May 14, 1912.

Application filed May 4, 1911. Serial No. 625,012.

*To all whom it may concern:*

Be it known that I, HERBERT J. SEWELL, citizen of the United States, residing at Detroit, county of Wayne, State of Michigan, have invented a certain new and useful Improvement in Vehicle-Wheels, and declare the following to be a full, clear, and exact description of the same, such as will enable others skilled in the art to which it pertains to make and use the same, reference being had to the accompanying drawings, which form a part of this specification.

This invention relates to vehicle wheels.

It has for its object an improved wheel having in combination with what is known as a solid rubber tire, a resilient felly structure in which provision is made for a resilient yielding action of the inner part of the rim with respect to the outer part thereof, which is maintained without introducing the liability of lateral displacement incident to the radial variation which accompanies such resilient action.

In the drawings:—Figure 1, is a side elevation of a completely assembled wheel. Fig. 2, is a cross section through the felly and tire wheel. Fig. 3, is a longitudinal section around the rim showing a part of the inner and outer member of the felly with interposed resilient packing. Fig. 4, shows the varying shapes of the cushioning tube in the wheel when in action.

A hub 1 may be provided with spokes 2 and with a rigidly constructed felly member 3 of ordinary or common wheel construction, a second felly member 4 is held to the felly member 3 as hereinafter described. A clencher ring 5 is secured to the outer felly member 4 and a solid tire 6 of any improved form of construction, engages in the clencher ring. The resilient rings (of which there are two, each made with three zones,) unite the concentric felly members 3 and 4; the inner zone 8 of each ring is made on a resilient foundation with reinforcing bands of textile material 11. An outer zone 10 is made on a foundation of resilient material with a reinforcing band 11 of textile material and between the two zones 8 and 10 a more highly flexible zone 12 of the resilient material thinner than either of the zones 8 and 10 and without the reinforcing material. Two such bands are employed to connect together the two felly members 3 and 4. Each of these two elastic rings are held securely against the felly members by rigid binding rings or bands 13—14, 15—16, each of which is substantially broader than the felly member to which it is most closely adjacent. I have found in practice that the width of the space between the edges of the respective pairs of rings or bands 13—14 and 15—16 should be substantially about one-half of the distance between the felly 3 and annular ring 4, each pair of bands projecting about one fourth of the distance between the felly and band, thus producing a pair of overhanging flanges that engage the flexible rings; and serves as abutments to resist the lateral displacement of one felly member with respect to the other, thus the metal binding rings 15 and 16 are greater in width than the felly member 3 and constitute in part flanges that extend beyond the periphery of the felly member 3 and serve to aid in preventing the lateral displacement of one felly member with respect to the other while the binding rings 13, 14, have a periphery larger than the felly 4 and project beyond it as shown, with the same effect.

Between the two felly members are preferably interposed a number of cushioning members 17, each cushioning member consisting of a portion of a tube of resilient material having a diameter such that in the assembled structure the several tubes 17 extend radially across the annular chamber between the felly members 3 and 4 and are in contact with one another entirely around the chamber between said felly. In their normal condition each one of the several tubes 17 is cylindrical but under ordinary conditions of use, when there is the strain of a load resting upon the wheel, those of the tubes which lie along the under side of the wheel are distorted and assume an oval shape with the long axis of the oval at right angles to a radius of the wheel; those which are at the upper side of the wheel assume an oval shape with the long axis of the oval parallel to a radius of the wheel, while those that are midway between the top and the bottom are only slightly distorted from their normal shape. The amount of distortion is in no wise uniform, the greatest distance being on those which are at the very lowest point and at the very highest point and those which are on the exactly horizontal diameter of the wheel are most nearly in their normal condition and as the wheel rolls, the condition of distortion or strain continually changes producing a constantly varying condition in these tubular cushioning members. At the same time each of the tubular sections is held by its engagement at its ends against the elastic bands and through them against the metal rings 13 and 14 and 15 and 16 which extend partially over the annular chamber 18 as already described, and resist the tendency to lateral displacement of one part of the wheel with respect to the other. The side rings being resilient, allow the one part of the wheel to move with respect to the other in the way described, and aid in holding the interposed cushioning members 17 in their proper position and serve to exclude from the chamber dirt and water.

The rings 13 and 14 are secured to the felly 4 by bolts 19 and the rings 15 and 16 are secured to the felly 3 by bolts 20.

The fully assembled wheel is efficient because any sudden displacement of the outer felly with respect to the inner one is resisted by the series of resilient members that extend entirely around the annular chamber between the two fellies and especially by the opposite clamping rings of each pair as 13—16, or 14—15 (depending upon the direction of the transverse thrust), this distributes the shock to the resilient members all of whom tend to regain their normal condition immediately. This cushioning act is illustrated in Fig. 4; the effect of such cushioning action in this figure being somewhat exaggerated for the purpose of more clearly illustrating it. In this figure weight upon the hub of the wheel tends to vertically compress the tubes 17 as seen at the lower part of the wheel and of course in shortening their vertical diameter the horizontal diameter is expanded. At the sides of the wheel, the tubes are not under strain to any extent and are capable of a vertical movement along the inner rim 3, but this vertical movement must tend to compress horizontally the upper tubes of the wheel and thus lengthen their vertical axes in proportion and as the outer rim is drawn away from the inner rim at that point; as all of the inner tubes 17 are closely packed they contact with some force and being elastic it is obvious that any disturbance by compression as at the lower part of the wheel at Fig. 4 combined with the movement of one rim with reference to the other coinciding with that compression, must necessarily produce a disturbance in the intervening layer of tubes 17 in substantially the manner and with the result stated. It is not however to be understood that the compression and lateral distention of the lower layer of tubes is followed exactly by a perfectly similar horizontal compression and the vertical distention of the upper layer; there is no exact inverse proportional variation but only a substantial correspondence as stated.

What I claim is:—

1. A vehicle wheel having in combination a pair of annular rim members spaced by an annular chamber, resilient cushioning members engaging in said chamber, said cushioning members being circular in form and arranged with the axes of the central cushioning members parallel with the axle of the wheel and with the cushioning members in contact, rings of resilient material extending as described over the space of said chamber and with zones of said rings engaging over the side face of said rim members, holding rings secured to said rim members and extending from each rim member partially over said annular chamber adapted to support the resilient ring and form an abutment for said cushioning members and adapted to coact with said cushioning members to prevent the lateral movement of one of said felly members with respect to the other.

2. A vehicle wheel comprising a spoke-supported felly, an annular band surrounding said felly and separated therefrom to provide an annular space, a resilient cushioning element arranged in said annular space, a pair of annular rings of resilient material lapping the lateral faces of said felly and band and closing said annular space, each of said resilient rings provided on its outer face opposite said annular space with a concave groove to permit said grooved portions to bend inwardly toward said annular space under radial compression, clamping bands arranged on the lateral faces of said resilient rings opposite to the sides of said felly and band, and means engaging said felly and band for securing said clamping rings in position to thereby hold said resilient rings against displacement and simultaneously resist the lateral distortion of said cushioning element.

3. A vehicle wheel comprising a felly, an annular band surrounding said felly and separated therefrom to provide an annular space, a resilient cushioning element arranged in said annular space, a pair of annular rings of resilient material lapping the lateral faces of said felly and band and closing said annular space, abutting bands arranged on the lateral faces of said resilient rings opposite to the sides of said felly and band, the inner edges of the outer pair of abutting bands extending substantially inwardly beyond the inner face of said annular band, and the outer edges of the inner pair of abutting bands extending substantially outwardly beyond the outer face of said felly, and means engaging said felly and band for securing said abutting bands in position to thereby hold said resilient rings against displacement to resist the lateral distortion of said cushioning element and to hold the inner and outer fellies in proper side relations, substantially as set forth.

In testimony whereof, I sign this specification in the presence of two witnesses.

HERBERT J. SEWELL.

Witnesses:
CHARLES F. BURTON,
VIRGINIA C. SPRATT.